(12) United States Patent
Thorn (10) Patent No.: US 7,698,326 B2
(45) Date of Patent: Apr. 13, 2010

(54) WORD PREDICTION

(75) Inventor: Ola Karl Thorn, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 356 days.

(21) Appl. No.: 11/627,495

(22) Filed: Jan. 26, 2007

(65) Prior Publication Data

US 2008/0126314 A1    May 29, 2008

Related U.S. Application Data

(60) Provisional application No. 60/867,290, filed on Nov. 27, 2006.

(51) Int. Cl.
*G06F 7/00* (2006.01)

(52) U.S. Cl. .................. 707/705; 707/736; 707/758; 707/769; 707/772

(58) Field of Classification Search .................. None
See application file for complete search history.

(56) References Cited

U.S. PATENT DOCUMENTS

| 7,302,475 B2* | 11/2007 | Gold et al. ............... 709/217 |
| 7,392,326 B2* | 6/2008 | Vale ......................... 709/245 |
| 2006/0069746 A1* | 3/2006 | Davis et al. .............. 709/218 |
| 2006/0217953 A1 | 9/2006 | Parikh ......................... 704/1 |

FOREIGN PATENT DOCUMENTS

WO    2004/111871    12/2004

OTHER PUBLICATIONS

International Search Report and Written Opinion for PCT Application No. PCT/IB2007/052019 mailed Dec. 4, 2007, 11 pages.

* cited by examiner

*Primary Examiner*—Hung Q Pham
(74) *Attorney, Agent, or Firm*—Harrity & Harrity, LLP (57) ABSTRACT

A method includes receiving input from a user via a keypad of the communication device and searching a database and a cache to identify a word or web site identifier based on the received input. The word or web site identifier may correspond to a word or web site identifier that the user intends to input. The method may also include providing the word or web site identifier via a display of the communication device.

20 Claims, 7 Drawing Sheets

WORD PREDICTION

RELATED APPLICATION

This application claims priority under 35 U.S.C. §119 based on U.S. Provisional Application No. 60/867,290, filed Nov. 27, 2006, the disclosure of which is hereby incorporated herein by reference.

TECHNICAL FIELD OF THE INVENTION

The invention relates generally to communications and, more particularly, to word prediction based on user input.

DESCRIPTION OF RELATED ART

Communication devices, such as mobile terminals, may be used by individuals for communicating with users of other communication devices. For example, a communication device may be used to place/receive calls and send/receive text messages to/from other communication devices. Communication devices typically allow the user to enter text, such as text messages, via an alpha-numeric keypad.

SUMMARY

According to a first aspect, a method in a communication device comprises: receiving input from a user via a keypad of the communication device and searching a first database to identify at least one word or uniform resource locator (URL) based on the received input, where the at least one word or URL corresponds to a word or URL that the user intends to input. The method also comprises searching a cache to identify the at least one word or URL. The method further comprises providing the at least one word or URL via a display of the communication device.

Additionally, the method may comprise accessing web sites based on input from the user; and storing, in the cache, at least one of web site content or URLs associated with the accessed web sites.

Additionally, the providing may comprise providing a plurality of words or a plurality of URLs that potentially correspond to information that the user is attempting to enter via the keypad, and providing the plurality of words or plurality of URLs prior to completion of entry of the information by the user.

Additionally, the searching the cache may comprise searching the cache based on at least two prior words of a message input by the user.

Additionally, the method may further comprise storing URLs in the cache for a predetermined period of time.

Additionally, the method may further comprise storing at least portions of web pages in the cache for a predetermined period of time.

Additionally, the providing the at least one word or URL may comprise providing at least one of a plurality of words or a plurality of URLs. The method may also further comprise receiving a selection by the user corresponding to a first one of the words or a first one of the URLs; storing the first word or first URL in the first database in response to the selection, the first database being a more permanent storage location than the cache; and performing word recognition based on input from the user via a keypad based on information stored in the first database.

Additionally, the method may further comprise viewing a picture or image, identifying a name or word associated with the picture or image, and storing the identified name or word in the cache.

According to another aspect, a communication device is provided. The communication device comprises an input device configured to receive input from a user, a first memory, a cache and a display. The communication device also comprises logic configured to: search the first memory and the cache to identify at least one word or web site identifier based on the received input, provide the at least one word or web site identifier via a display of the communication device, receive a selection corresponding to the at least one word or web site identifier that was identified from the cache, and store the selected at least one word or web site identifier in the first memory.

Additionally, the logic may be further configured to perform word recognition using information stored in the first memory and the cache.

Additionally, when providing the at least one word or web site identifier, the logic is configured to provide at least one uniform resource locator (URL).

Additionally, the URL may be associated with a web site accessed by the communication device.

Additionally, the communication device may further comprise a communication interface configured to access web sites via a network based on input from the user via the input device. The logic may also be further configured to store web site identifiers and web site content associated with the accessed web sites in the cache.

Additionally, when storing the web site identifiers and web site content, the logic may be configured to store the web site identifiers and web site content for a predetermined period of time.

Additionally, the logic may be further configured to delete a first one of the web site identifiers and first web site content associated with the first web site identifier stored in the cache based on at least one of a duration of time that the first web site identifier and the first web site content have been stored in the cache or lack of selection by a user via the input device corresponding to the first web site identifier or first web site content.

Additionally, the first memory may be further configured to store images or pictures and the logic may be further configured to: identify a name or word associated with the picture, and store the identified name or word in the cache.

Additionally, the cache may comprise an index of words associated with information stored in the communication device.

Additionally, the at least one word or web site identifier may comprise at least one of a plurality of words or a plurality of web site identifiers associated with information accessed by the communication device.

Additionally, the input from the user may comprise at least a portion of a message and when searching the cache, the logic may be configured to search the cache to identify the at least one word or web site identifier based on at least two previous words of the portion of the message.

Additionally, the input from the user may comprise at least a portion of a message and when searching the cache, the logic may be configured to search the cache to identify the at least one word or web site identifier based on a previous word of the portion of the message, the previous word being located at least two words prior to the at least one word or web site identifier.

Additionally, the communication device may comprise a mobile terminal.

According to a further aspect, a computer-readable medium having stored thereon sequences of instructions is provided. The instructions, when executed by at least one processor, cause the at least one processor to receive input from a user via an alpha-numeric keypad and search a first database including information accessed by the user to identify at least one potential word or identifier which the user intends to input. The instructions also cause the at least one processor to provide the at least one potential word or identifier to the user via a display.

Additionally, the computer-readable medium may include further instructions for causing the at least one processor to: access information via a network in response to input from the user; and store at least some of the accessed information in the first database.

Additionally, the computer-readable medium may include further instructions for causing the at least one processor to store web site identifiers and web site content in the first database, the web site identifiers and web site content being associated with web sites accessed by the user.

Additionally, the computer-readable medium may include further instructions for causing the at least one processor to receive selections from the user corresponding to words and identifiers provided via the display and that were identified from the first database, and store the selected words and identifiers in a second database, where the second database corresponds to a more permanent database than the first database.

According to still another aspect, a communication device comprising an alpha-numeric keypad, a display, a first memory, a second memory and logic is provided. The alpha-numeric keypad is configured to receive input from a user. The first memory is configured to store information associated with web sites or documents accessed by the communication device and the second memory is configured to store a database. The logic is configured to search the first memory and the second memory to identify at least one word or web site identifier based on the received input, and provide the at least one word or web site identifier via a display of the communication device.

Additionally, the logic may be further configured to receive a selection corresponding to the at least one word or web site identifier provided via the display, and store the selected at least one word or web site identifier in the database, wherein the database represents a more permanent storage location than the first memory.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Exemplary System

Figure 1:
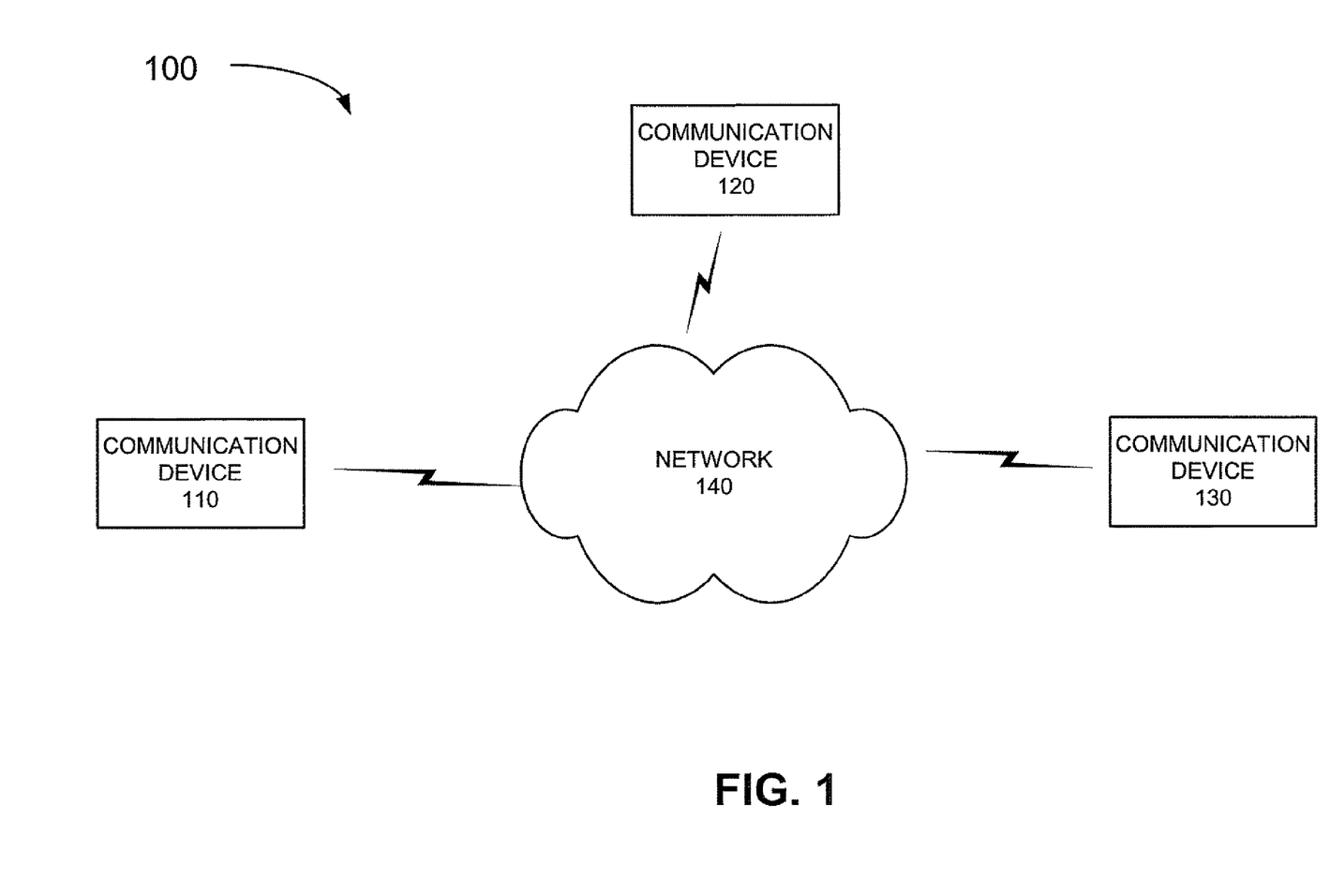
FIG. 1 is a diagram of an exemplary system in which methods and systems described herein may be implemented.

FIG. 1 is a diagram of an exemplary system 100 in which methods and systems described herein may be implemented. System 100 may include communication devices 110, 120 and 130 connected via network 140. The exemplary configuration illustrated in FIG. 1 is provided for simplicity. It should be understood that a typical system may include more or fewer devices than illustrated in FIG. 1. In addition, other devices that facilitate communications between the various entities illustrated in FIG. 1 may also be included in system 100.

Communication devices 110-130 may each include any type of conventional device that is able to communicate via a network. For example, communication devices 110-130 may include any type of device that is capable of transmitting and receiving data (e.g., voice, text, images, multi-media data) to/from network 140. In an exemplary implementation, one or more of communication devices 110-130 may be a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

In an alternative implementation, one or more of communication devices 110-130 may include any client device, such as a personal computer (PC), a laptop computer, a PDA, a web-based appliance, etc., that is able to transmit and receive data via network 140. Communication devices 110, 120 and 130 may communicate with each other over network 140 via wired, wireless or optical connections.

Network 140 may include one or more networks including a cellular network, a satellite network, the Internet, a telephone network, such as the Public Switched Telephone Network (PSTN), a metropolitan area network (MAN), a wide area network (WAN), a local area network (LAN), a mesh network, or another type of network. In an exemplary implementation, network 140 includes a cellular network that uses components for transmitting data to and from communication devices 110, 120 and 130. Such components may include base station antennas (not shown) that transmit and receive data from communication devices within their vicinity. Such components may also include base stations (not shown) that connect to the base station antennas and communicate with other devices, such as switches and routers (not shown) in accordance with known techniques.

Figure 2:
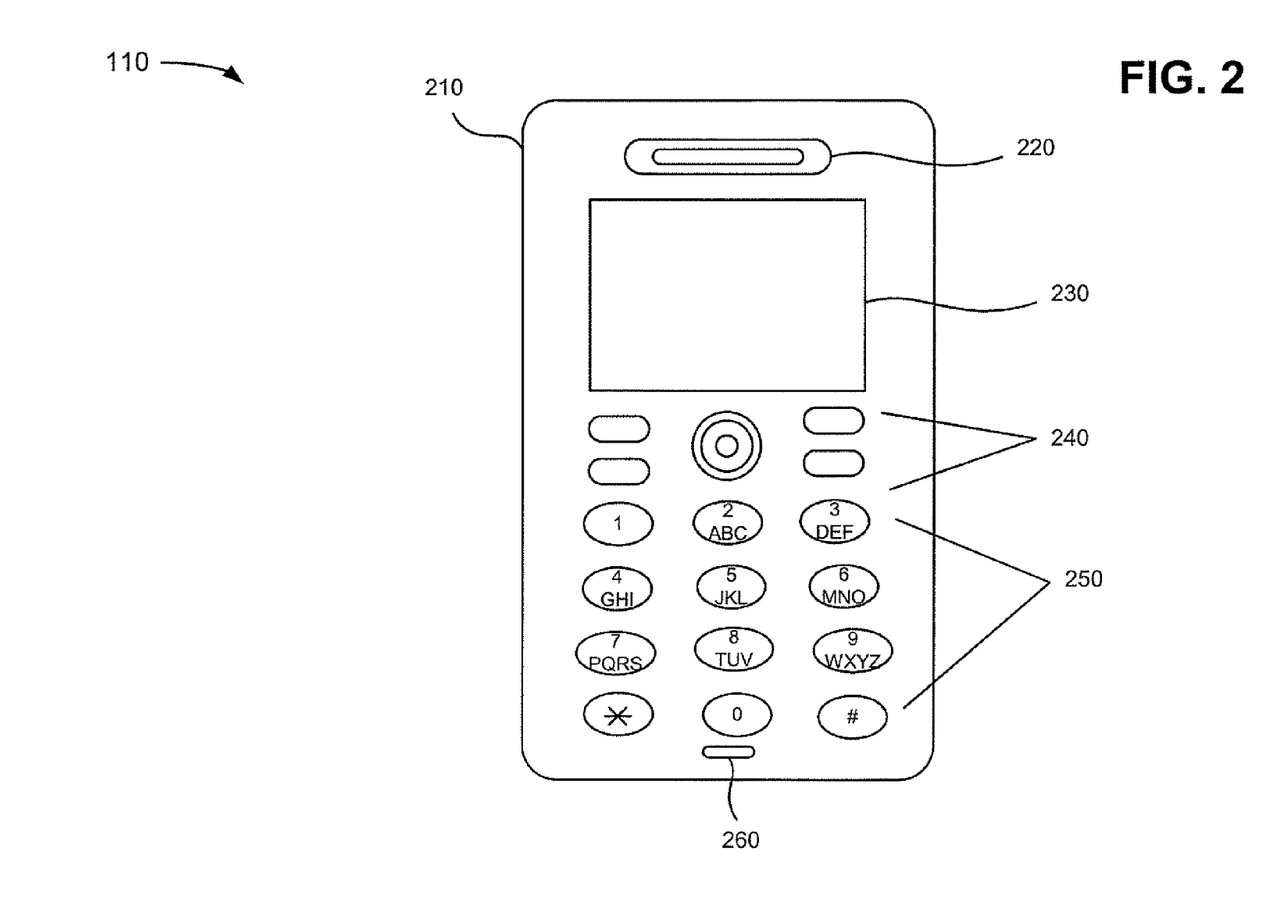
FIG. 2 is a diagram of a communication device of FIG. 1 according to an exemplary implementation.

FIG. 2 is a diagram of an exemplary communication device 110 in which methods and systems described herein may be implemented. Aspects of the invention are described herein in the context of a communication device. It should also be understood that systems and methods described herein may also be implemented in other devices that allow users to enter information via an alpha-numeric keypad, with or without including various other communication functionality. For example, communication device 110 include a personal computer (PC), a laptop computer, a PDA, a media playing device (e.g., an MPEG audio layer 3 (MP3) player, a video game playing device), etc. that does not include various communication functionality for communicating with other devices.

Referring to FIG. 2, communication device 110 may include a housing 210, a speaker 220, a display 230, control buttons 240, a keypad 250, and a microphone 260. Housing 210 may protect the components of communication device 110 from outside elements. Speaker 220 may provide audible information to a user of communication device 110.

Display 230 may provide visual information to the user. For example, display 230 may provide information regarding incoming or outgoing telephone calls and/or incoming or outgoing electronic mail (e-mail), instant messages, short message service (SMS) messages, etc. Display 230 may also display information regarding various applications, such as a phone book/contact list stored in communication device 110, the current time, video games being played by a user, downloaded content (e.g., news or other information), etc.

Control buttons 240 may permit the user to interact with communication device 110 to cause communication device 110 to perform one or more operations, such as place a telephone call, play various media, etc. For example, control buttons 240 may include a dial button, hang up button, play button, etc. In an exemplary implementation, control buttons 240 may include one or more buttons that controls various settings associated with display 230. For example, one of control buttons 240 may be used to execute an application program, such as a messaging program. Further, one of control buttons 240 may be a menu button that permits the user to view options associated with executing various application programs stored in mobile communication device 110.

Keypad 250 may include a standard telephone keypad. As illustrated, many of the keys on keypad 250 may include numeric values and various letters. For example, the key with the number 2 includes the letters A, B and C. These letters may be used by a user when inputting text to communication device 110. Other types of input devices may also be provided. For example, in other implementations, a touch screen may be provided to enter information. In still other implementations, a QWERTY keyboard or a Dvorak keyboard may be used. In addition, a gesture-based input device, an optical character recognition (OCR) based input device, a joystick, a virtual keyboard, a speech-to-text engine, etc., may be used to input information to communication device 110. Microphone 260 may receive audible information from the user.

Figure 3:
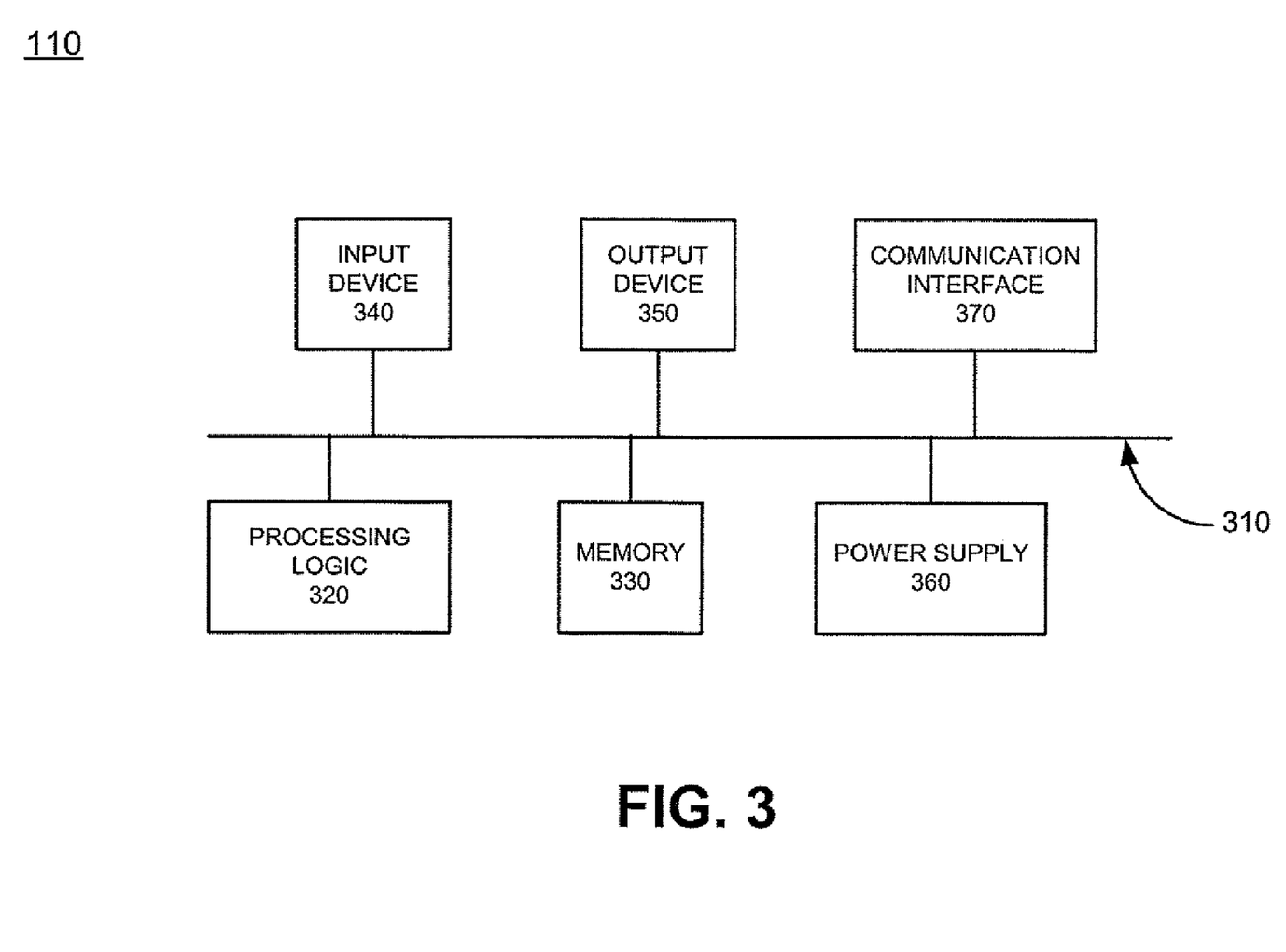
FIG. 3 is a functional block diagram of components implemented in the communication device of FIG. 2 according to an exemplary implementation.

FIG. 3 is a diagram illustrating components of communication device 110 according to an exemplary implementation. Communication device 110 may include bus 310, processing logic 320, memory 330, input device 340, output device 350, power supply 360 and communication interface 370. Bus 310 permits communication among the components of communication device 110. One skilled in the art would recognize that communication device 110 may be configured in a number of other ways and may include other or different elements. For example, communication device 110 may include one or more modulators, demodulators, encoders, decoders, etc., for processing data.

Processing logic 320 may include a processor, microprocessor, an application specific integrated circuit (ASIC), field programmable gate array (FPGA) or the like. Processing logic 320 may execute software instructions/programs or data structures to control operation of communication device 110.

Memory 330 may include a random access memory (RAM) or another type of dynamic storage device that stores information and instructions for execution by processing logic 320; a read only memory (ROM) or another type of static storage device that stores static information and instructions for use by processing logic 320; a flash memory (e.g., an electrically erasable programmable read only memory (EEPROM)) device for storing information and instructions; and/or some other type of magnetic or optical recording medium and its corresponding drive. Memory 330 may also be used to store temporary variables or other intermediate information during execution of instructions by processing logic 320. Instructions used by processing logic 320 may also, or alternatively, be stored in another type of computer-readable medium accessible by processing logic 320. A computer-readable medium may include one or more memory devices and/or carrier waves.

Input device 340 may include mechanisms that permit an operator to input information to communication device 110, such as microphone 260, keypad 250, control buttons 240, a keyboard (e.g., a QUERTY keyboard, a Dvorak keyboard), a gesture-based device, an OCR based device, a joystick, a virtual keyboard, a speech-to-text engine, a mouse, a pen, voice recognition and/or biometric mechanisms, etc.

Output device 350 may include one or more mechanisms that output information to the user, including a display, such as display 230, a printer, one or more speakers, such as speaker 220, etc. Power supply 360 may include one or more batteries or other power source components used to supply power to components of communication device 110.

Communication interface 370 may include any transceiver-like mechanism that enables communication device 110 to communicate with other devices and/or systems. For example, communication interface 370 may include a modem or an Ethernet interface to a LAN. Communication interface 370 may also include mechanisms for communicating via a network, such as a wireless network. For example, communication interface 370 may include one or more radio frequency (RF) transmitters, receivers and/or transceivers and one or more antennas for transmitting and receiving RF data via network 140.

Communication device 110 may provide a platform for a user to make and receive telephone calls, send and receive electronic mail, text messages, multi-media messages, short message service (SMS) messages, etc., and execute various other applications. Communication device 110, as described in detail below, may also perform processing associated with performing input or word prediction based on user input(s). Communication device 110 may perform these operations in response to processing logic 320 executing sequences of instructions contained in a computer-readable medium, such as memory 330. Such instructions may be read into memory 330 from another computer-readable medium via, for example, communication interface 370. A computer-readable medium may include one or more memory devices and/or carrier waves. In alternative embodiments, hard-wired circuitry may be used in place of or in combination with software instructions to implement processes consistent with the invention. Thus, implementations described herein are not limited to any specific combination of hardware circuitry and software.

Figure 4:
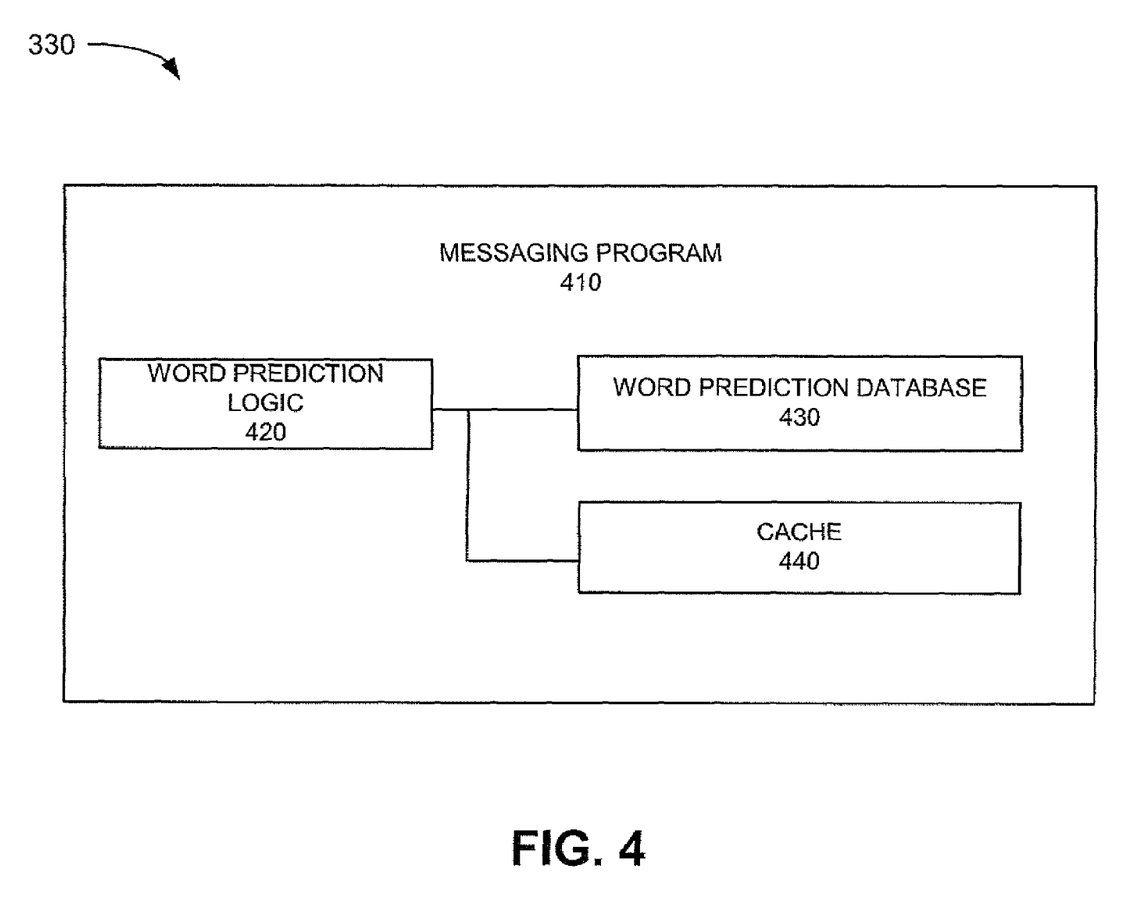
FIG. 4 is a functional block diagram of a messaging program implemented in the communication device of FIG. 3 according to an exemplary implementation.

FIG. 4 is an exemplary functional block diagram of components implemented in communication device 110 of FIG. 3, such as in memory 330. Referring to FIG. 4, memory 330 may include a messaging program 410 that includes word prediction logic 420, word prediction database 430 and cache 440. Word prediction logic 420, word prediction database 430 and cache 440 are shown in FIG. 4 as being included in messaging program 410. In alternative implementations, these components or a portion of these components may be located externally with respect to messaging program 410.

Messaging program 410 may include any type of messaging program used to transmit and receive messages to/from other devices, such as communication devices 120 and 130. For example, messaging program 410 may include a multimedia message service (MMS) based program, a short message service (SMS) based program, an instant messaging (IM) based program, an e-mail program, or another text based application program that allows communication device 110 to communicate with other devices.

Word prediction logic 420 may include logic used to predict text being entered by a user as the text is being entered or typed. Word prediction logic 420 may provide candidate characters, words, next characters, next words and/or phrases to the user via, for example, display 230 as the user is entering the text via keypad 250. The terms "candidate character," "candidate next character," "candidate word, "candidate next word" or "candidate phrase," as used herein refer to a character, next character, word, next word or phrase, respectively, that potentially matches the character/word/phrase that the user intends to input via keypad 250. Word prediction logic 420 may provide candidate words/phrases to the user via, for example, display 230 as the user is entering the text via keypad 250. In an exemplary implementation, word prediction logic 420 may use word prediction database 430 and cache 440 to perform word prediction, as described in detail below.

Word prediction database 430 may include a database of common words and/or phrases. In some implementations, word prediction database 430 may be dynamically updated as the user of communication device 110 enters messages and/or receives messages. For example, word prediction database 430 may be pre-loaded with a number of commonly used words and phrases that are most often used in a particular language. As the user generates and receives messages via messaging program 410 or another program, words/phrases not already stored in word prediction database 430 may be added to word prediction database 430. In this manner, word prediction database 430 is more likely to include words that may be used in the future by the user of communication device 110.

In an exemplary implementation, cache 440 may include a number of terms/words associated with accessing various external sites, such as websites accessible via the Internet. For example, a user of communication device 110 may access the Internet via a web browser executed by communication device 110. Processing logic 320 (FIG. 3) may store information associated with web pages accessed by communication device 110 in cache 440. For example, as a user of communication device 110 accesses various websites, processing logic 320 may store the web pages (e.g., hyper text markup language (HTML) files, portable document format (PDF) files, word processing format (e.g., Word) files, etc.) and identifiers (e.g., uniform resource locators (URLs) or some other identifier associated with a web site or web page) associated with various web sites or web pages in cache 440. The web pages and identifiers may then be used to aid word prediction logic 420 in generating candidate words based on user input, as described in detail below.

In one implementation, cache 440 may have a predetermined size and may be used to store the web pages and/or URLs a user has visited over a predetermined period of time (e.g., the last 1 day, 10 days, 30 days, 60 days, etc.). In each case, word prediction logic 420 may use cache 440 as a source for predicting words a user is inputting via messaging program 410.

Exemplary Processing

Figure 5:
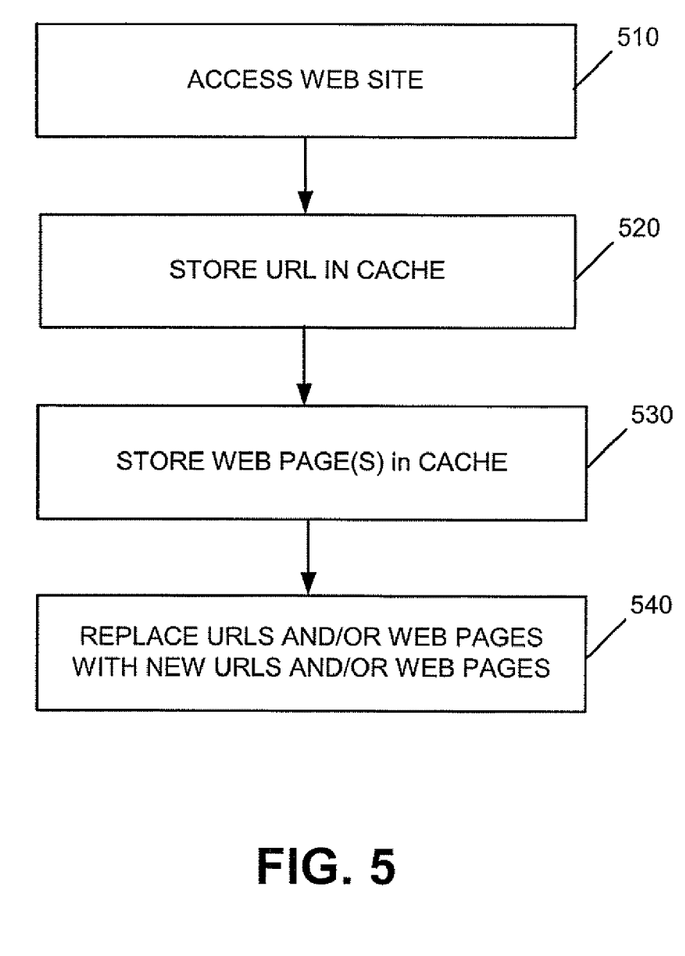
FIGS. 5 and 6 are flow diagrams illustrating exemplary processing by the communication device of FIG. 1.

FIG. 5 is a flow diagram illustrating exemplary processing by communication devices, such as communication device 110, for populating cache 440. Processing may begin with a user of communication device 110 launching an Internet browser stored in communication device 110 and accessing a website via network 140 (act 510). Processing logic 320 may store the URL for the web site in cache 440 (act 520). Processing logic 320 may also store one or more web pages or portions of web pages associated with the particular web site in cache 440 (act 530).

For example, processing logic 320 may store each web page visited by the user of communication device 110 in HTML format, PDF format, a word processing format (e.g., Word), or some other format in cache 440. Alternatively, processing logic 320 may parse each web page and store portions of each web page in cache 440. For example, processing logic 320 may store headers, titles, subtitles or other portions of each web page. These portions may correspond to portions of the web pages that are more likely to include relevant or important words/phrases. In addition, in some implementations, processing logic 320 may search one or more of the web pages for words and/or phrases that are not already stored in word prediction database 430 or cache 440 and store these words/phrases in cache 440.

As the user of communication device 110 visits more web sites, processing logic 320 continues to store URLs or some other identifier associated with web sites and web, web pages themselves and/or portions of web pages in cache 440. In some implementations, when cache 440 is full, processing logic 320 may delete existing URLs and/or web pages stored in cache 440 and replace them with new URLs and web pages (act 540). In these cases, processing logic 320 may store the URLs and/or web pages in a first in, first out manner such that the oldest URLs and web pages in cache 440 are deleted prior to more recently stored URLs and web pages. In other instances, the URLs and web pages in cache 440 may be stored for a predetermined period of time and automatically deleted upon expiration of the predetermined period. In still other implementations, processing logic 320 may determine if any of the URLs and/or terms associated with the web pages have been used by word prediction logic 420 prior to deleting or overwriting any URLs and/or web pages in cache 440. That is, if a term (URL or word in a web page) has been used by word prediction logic 420, that URL and/or web page may be tagged and may remain in cache 440. In still further implementations, URLs and corresponding web pages that have been access multiple times may be tagged to remain in cache 440.

As described above, in conventional systems, each alphanumeric button on keypad 250 (FIG. 2) may correspond to one of three different letters. For example, when a user inputs the number "2" via a conventional keypad (when executing a text based application), the corresponding text may be any of the letters A, B or C. In a conventional T9/Zi type predictive input scheme, a messaging program guesses or predicts which letter the user intended to type. For example, if the user enters "843," a conventional messaging program may assume that the user intended to enter the word "the." In such systems, the messaging program may use a dictionary of common words to predict what a user wishes to input. Such conventional systems, however, are often unable to find the correct word in various scenarios, such as when the user is entering words/terms not frequently used. In addition, increasing the size of the database of words and phrases known by the messaging program has a number of drawbacks, such as it consumes excessive power and memory, takes a considerable amount of time to search and may result in a large list of potential candidate words from which a user must scroll through to find the correct word.

In an exemplary implementation, word prediction logic 420 uses both word prediction database 430 and cache 440 to identify candidate words corresponding to input by a user, as described in detail below.

Figure 6:
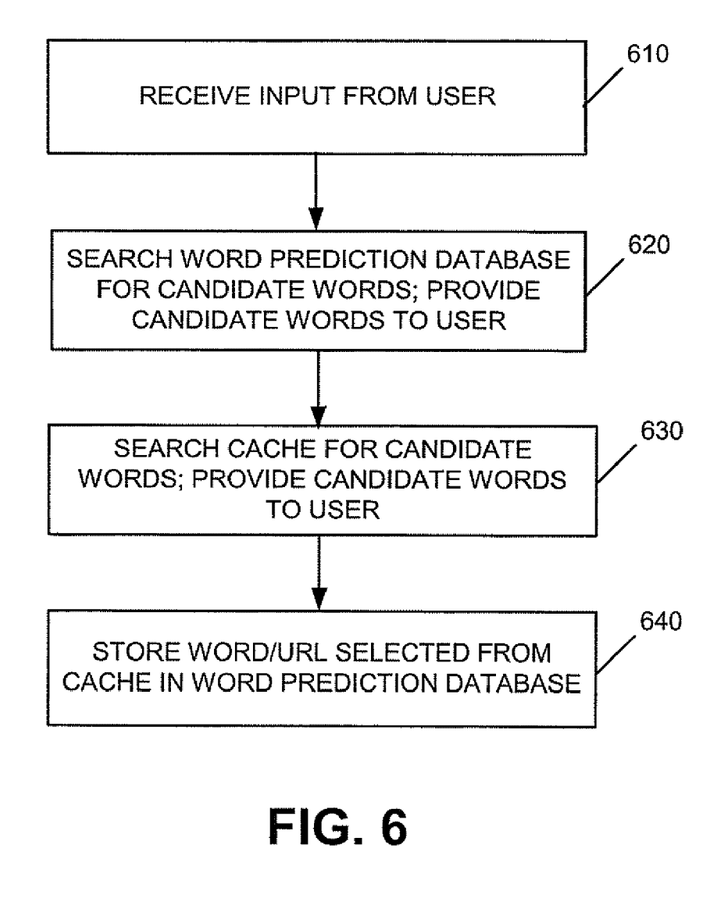
Figure 7A:
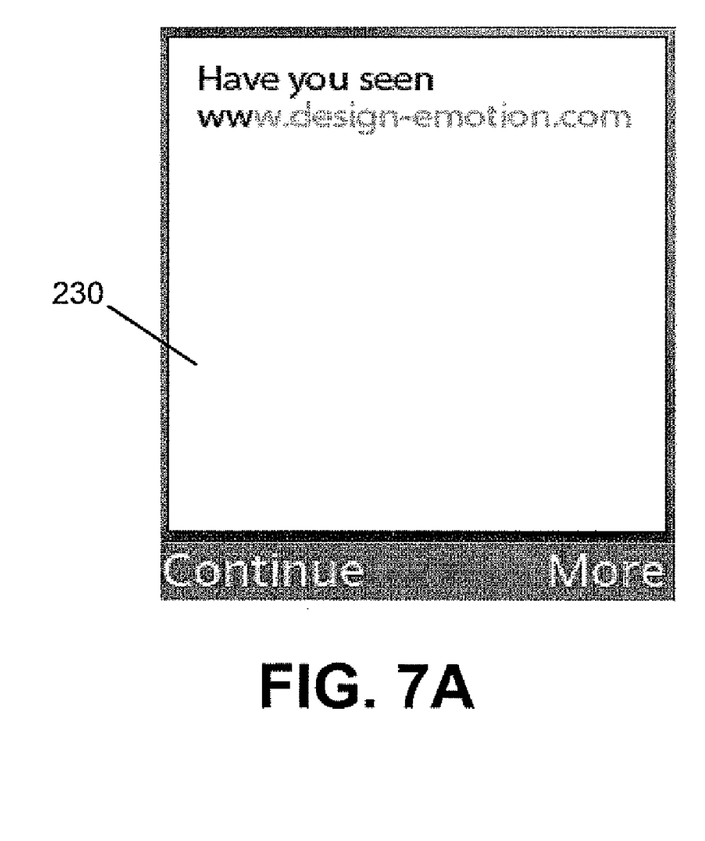
FIGS. 7A and 7B are exemplary diagrams illustrating a portion of the word prediction process performed by the communication device of FIG. 1.

FIG. 6 illustrates exemplary processing performed by messaging program 410. Processing may begin with communication device 110 executing messaging program 410 to generate and/or respond to a received message from another communication device (e.g., communication device 120, 130, etc.). Assume that the user is composing a message, such as that illustrated in FIG. 7A (act 610). Referring to FIG. 7A, assume that the user has entered the portion of the message "Have you seen ww" via keypad 250 and shown in bold in display 230. In this case, further assume that word prediction logic 420 has been used to provide the user with candidate words as the user typed this portion of the message. For example, after the user entered "428" in keypad 250 to start the message, word prediction logic 420 accessed word prediction database 430 to provide a candidate list of words to the user and that the word "have" was in this candidate list (act 620). Further assume that the candidate word "have" was selected by the user using a selection key (e.g., one of function keys 240) on communication device 110. Similar processing may occur for the terms "you" and "seen." That is, word prediction logic 420 accessed word prediction database 430 and identified one or more candidate words based on the user input.

Referring back to FIG. 7A, assume that the user has entered "99." In this case, word prediction logic 420 may determine that the user intends to identify the letters "ww" and provides these letters in display 230. Word prediction logic 420 may also determine that the user is intending to enter a URL associated with a web site since the letters "ww" are most frequently used when attempting to identify an Internet web site. In other implementations, communication device 110 may include one or more shortcuts for attempting to enter a URL, such as inserting a link symbol/pictogram or an abbreviation symbol (e.g., www/link, etc.) prior to entering the URL.

Figure 7B:
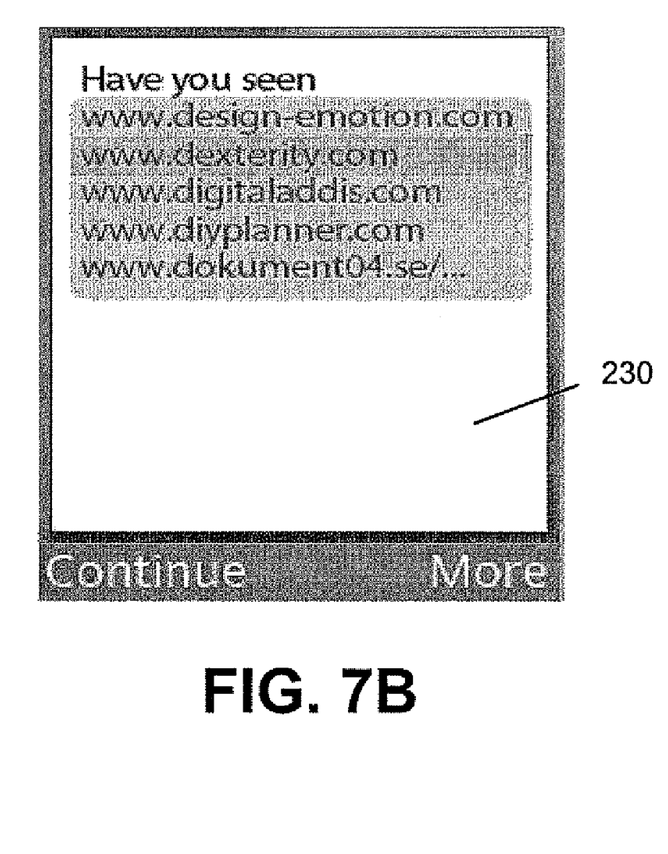

Word prediction logic 420 may then access cache 440 to access the URLs and web pages accessed by communication device 110 (act 630). In some instances, word prediction logic 420 may access URLs for a predetermined number of web sites most recently visited by communication device 110 and provide a candidate list of the URLs corresponding to these web sites to the user via display 230, as illustrated in FIG. 7B (act 630). Referring to FIG. 7B, the potential URLs are listed in display 230. The user of communication device 110 may simply use an input key (e.g., one of control keys 240) on communication device 110 to select the appropriate URL if one of the candidate URLs is the URL the user wishes to input. In other instances, word prediction logic 420 may access cache 440 and provide a number of URLs in an alphabetical manner. That is, word prediction logic 420 may display a number of URLs starting with the letter A, followed by a number of URLs with the letter B, etc. In still other instances, word prediction logic 420 may display a list of URLs in a combination of most recently visited web sites and alphabetical order. That is, the predetermined number of most recently visited web sites will be shown in alphabetical order in display 230.

Assume that none of the URLs provided in display 230 (e.g., the URLs of the most recently viewed web pages, the URLs displayed in alphabetical order, etc.) correspond to the URL that the user is intending to input. In this case, the user continues to enter information via keypad 250 and word prediction logic 420 continues to search for likely URLs based on the input provided by the user. For example, assume that the user of communication device 110 has recently visited the web site for Sony Ericsson to look for a new mobile phone and that the URL for this web site is stored in cache 440. In this case, if the user enters "999" corresponding to www, followed by "76", word prediction logic 420 may access cache 440 and determine that the most likely candidate is the URL www.sonyericsson.com. In this manner, word prediction logic 420 may continue to provide new candidate URLs as the user is inputting text to refine the potential candidates stored in cache 440 until the user selects one of the potential candidates.

If the user enters the full URL via keypad 250 prior to word prediction logic 420 providing the correct candidate URL, this new URL may be stored in word prediction database 430 or cache 440.

As another example, assume that the user intends to enter the word "velocipede." In this case, the user may press 8 on keypad 250 and word prediction logic 420 may suggest T. The user may then press 3 on keypad 250 and word prediction logic 420 may suggest TE or VE. The user further enters 5 on keypad 250 and word prediction logic 420 may suggest TEL, VEL and TELEPHONE. Assume that the user further presses 6 on keypad 250 and word prediction logic 420 suggests TELO and VELO. At this point, word prediction logic 420 may start to run out of candidate words in word prediction database 430. In an exemplary implementation, after a predetermined amount of input (e.g., a number of keypad inputs without a selection of a word by the user), word prediction logic 420 may access cache 440 to identify any potential matching candidates. In this case, assume that the user of communication device 110 visited a web site that involved early bicycles and the term "velocipede" was included on a web page accessed by communication device 110. Further assume that the web page including the term "velocipede" is stored in cache 440.

In this example, word prediction logic 420 may identify the term velocipede as a potential candidate for the input provided by the user (i.e., input "8356") and may provide that term to the user in display 230. If this is the word the user is intending to enter, the user may select the candidate word via a selection button (e.g., one of control buttons 240) without requiring the user to enter more of the letters of the word. This may save the user considerable time when entering words/terms that are not commonly used.

In the description above, word prediction logic 420 was described as accessing cache 440 after a predetermined portion of keypad input has occurred without a correct candidate word being identified from word prediction database 430. In other implementations, word prediction logic 420 may search word prediction database 430 concurrently with cache 440. That is, word prediction logic 420 may search both word prediction database 430 and cache 440 upon a first keypad input by the user of communication device 110. In this manner, more candidate words may be provided to the user earlier in the input process.

Assume that the user has selected the term "velocipede", word prediction logic 420 may store this term in word prediction database 430 (act 640). That is, word prediction logic 420 may determine that since the user used this term in a message, it is more likely that the user will use this term in the future as well. In this manner, word prediction database 430 may be enhanced to include words/terms from cache 440.

Similarly, candidate URLs that were provided from cache 440 and selected by the user may also be stored in word prediction database 430 (act 640). This allows URLs and words that were temporarily stored in cache 440 to be more permanently stored for use by word prediction logic 420. In addition, words that have been entered by a user for which the correct candidate words were not provided by word prediction logic 420 prior to entry of the complete word may also be stored in word prediction database 430.

As still another example, assume that the user has entered "I want to play" via keypad 250 and the user has selected these words based on candidate words provided by word prediction logic 420. In a conventional word prediction system, the system will only provide next word candidates based on what the user has previously written. In this case, if the user has never written "I want to play" in a message, the conventional system will have no candidate next words until the user begins typing additional text associated with the next word.

In accordance with an exemplary implementation, word prediction logic 420 may access cache 440 to search for next word candidates prior to user providing input subsequent to the phrase "I want to play". In this example, word prediction logic 420 may search for any occurrence of "play" in cache 440. Assume that word prediction logic 420 finds the word "games" after play on an HTML web page in cache 440. In this case, word prediction logic 420 suggests the word "games" as a candidate word prior to the user entering any further keypad input after the phrase "I want to play". Using cache 440 in this manner further increases the speed with which candidate words are provided and subsequently increases the speed with which a user may enter messages via messaging program 410.

In another scenario, word prediction logic 420 may base the next word prediction upon more than one term already entered. For example, assume that the term "I want to play the" has been entered. In this case, word prediction logic 420 may not look for a word in cache 440 that follows the word "the" since this would result in too many candidates. Instead, word prediction logic 420 may look for a word/phrase following "play the" that is stored in cache 440. In this case, assume that cache 440 stores the phrase "play the violin". In this case, word prediction logic 420 may suggest "violin" as a candidate word to the user of communication device 110 via display 230. Providing candidate words based on two or more prior words further increases the utility of word prediction logic 420.

Alternatively, word prediction logic 420 may ignore articles of speech, such as the words "a," "an," and "the" when identifying candidate words based on previous words. For example, if the phrase "I want to play the" has been entered by a user via keypad 250, word prediction logic 420 may ignore the word "the" in attempting to identify a next word candidate and base its next word prediction on the word "play" or the phrase "I want to play" to identify a candidate word or phrase.

Word prediction logic 420 may also use various statistical tools in analyzing input from a user. For example, word prediction logic 420 may use a statistical tool, such as n-grams, to perform, for example, next word prediction, syntax related prediction, etc. An n-gram is a sub-sequence of n items from a given sequence. Word prediction logic 420 may use n-grams to aid in performing word completion and next word prediction. Word prediction logic 420 may also use other statistical tools to aid in word prediction, including using word frequencies to determine a word/next word based on statistical probabilities associated with word frequency usage. Word prediction logic 420 may also use syntax, grammar and writing style information associated with the user based on, for example, information gathered over time associated with input provided by the user, to aid in word/next word prediction.

Word prediction logic 420 may also perform spell checking related processing. For example, if word prediction logic 420 identifies a particular input as corresponding closely to a word/term in word prediction database 430 or cache 440, but that the input includes one or more minor deviations (e.g., one digit input by the user does not correspond to the candidate word), word prediction logic 420 may determine that the user may have input or spelled the word incorrectly. In this case, word prediction logic 420 may provide the word/term that closely matches the input from the user and is spelled correctly. That is, word prediction logic 420 may provide a word/term that corresponds to the input provided by the user without the spelling error. Word prediction logic 420 may also perform grammar related checking. For example, word prediction logic 420 may automatically correct grammar related errors input by the user.

Cache 440 has been described above as being stored in communication device 110. In some implementations, cache 440 may be located externally with respect to communication device 110. In this case, word prediction logic 420 may access the external cache 440, such as via network 140 or some other mechanism, when performing character/word/next word prediction.

CONCLUSION

Implementations consistent with the aspects described herein provide for more efficient word prediction based on cached data. This may provide for enhanced user experience with respect to entering text. This enhanced functionality may also ease user frustration with respect to entering text, thereby increasing the use of text messaging. Such increased use of text messaging may also increase revenue associated with a service provider associated with the receipt and transmission of messages.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, aspects described herein focus on caching information associated with web sites accessed by a user of communication device 110. In other instances, other sources of temporary word candidates may be used to predict input from a user. For example, the cached data may include data associated with internal sites within a company (e.g., company related data), data associated with a document that the user of communication device 110 has accessed multiple times or any other data that may likely include words/phrases that a user of communication device 110 may use when generating a message.

In one implementation, cache 440 may include data indexed from one or more storage devices on communication device 110, which as discussed above may be a mobile terminal, PC, laptop computer, etc. In the case where communication device is a PC or laptop computer, an index of all words/terms stored on communication device 110 may be stored in cache 440 or an index of all words/terms from a hard drive of communication device 110 may be stored in cache 440. Alternatively, the words/terms stored in particular files or words/terms associated with various applications on communication device 110 may be indexed and stored in cache 440. In each case, word prediction logic 420 may use this additional indexed content to identify candidate characters or words, such as characters/words currently being entered, and to identify next word candidates, such as next words associated with a phrase.

In other implementations, cache 440 may be populated using a messaging history of the user (e.g., content associated with previous messages generated and/or received by the user), content from bulletin boards accessed by the user, desktop search content from a desktop search application or any other sources of data that may contain words/phrases that a user may input when generating text.

In addition, in some implementations, image recognition and/or optical character recognition (OCR) may be used to generate text data. In this case, pictures could be scanned into cache 440 and an image or facial recognition algorithm may be used to identify names associated with people in various pictures (e.g., names of movie stars, sports stars, etc.). For example, suppose that a user of communication device 110 has recently viewed a picture of the actor Chevy Chase and that this image is scanned into cache 440. An image recognition program may identify that the actor is Chevy Chase and store this text data in cache 440. Alternatively, the image of the particular person may not be stored in cache 440, but the name corresponding to the picture may be stored in cache 440. That is, the image/facial recognition algorithm may identify images viewed by the user of communication device 110 and store a corresponding name or label associated with the image in cache 440. In still other instances, subtitles associated with movies viewed by the user of communication device 110 may stored in cache 440. In this case, OCR may be used to identify the subtitles and store the subtitles in cache 440. In each case, word prediction logic 420 may generate candidate words, candidate phrases, candidate URLs in response to user input using names, labels or some other identifier associated with a picture. In addition, using OCR, foreign language content (e.g., Chinese signs/characters or other foreign language symbols/content) in pictures could also be scanned and identified for inclusion in cache 440.

In still other implementations, a voice or speech to text engine may be used to convert speech into text for storage in cache 440. In this case, voice input provided by the user of communication device 110, such as when the user is conversing with another party (e.g., during a telephone call), may be input to the voice/speech to text engine and the text corresponding to the voice input may be stored in cache 440. Alternatively, the voice input from a movie played by communication device 110 may be input to the voice/speech to text engine to generate text corresponding to the voice input and all or a portion of this text may be stored in cache 440.

In addition, cache 440 may also include location related information. For example, communication device 110 may include a GPS receiver or some other device that enables communication device 110 to determine its location. Communication device 110 may then store various location related information that identify a history of physical locations where communication device 110 has been, such as city names, state names, country names, etc. For example, if the user of communication device 110 has used communication device 110 in Washington, D.C. and Lund, Sweden (or been in these places with communication device 110), communication device 110 may store the locations Washington, D.C. and Lund, Sweden in cache 440.

Further, while series of acts have been described with respect to FIGS. 5 and 6, the order of the acts may be varied in other implementations consistent with the invention. Moreover, non-dependent acts may be performed in parallel.

It will also be apparent to one of ordinary skill in the art that aspects of the invention, as described above, may be implemented in, for example, computer devices, cellular communication devices/systems, methods, and/or computer program products. Accordingly, the present invention may be embodied in hardware and/or in software (including firmware, resident software, micro-code, etc.). Furthermore, aspects of the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A method perform by a communication device, the method comprising:
   updating, by the communication device, a database of words and phrases based on text included in messages sent or received by a user of the communication device;
   accessing, by the communication device, web sites based on input from the user;
   storing, in a cache of the communication device, Uniform Resource Locators (URLs) and web site content associated with the accessed web sites, where the cache is different from the updated database;
   receiving one or more characters from the user via a keypad of the communication device;
   searching, using a processor of the communication device, the updated database to identify at least one first word or URL based on the received one or more characters;
   providing the identified at least one first word or URL via a display of the communication device;
   receiving one or more additional characters from the user via the keypad without selection of the provided at least one first word or URL;

searching, using the processor, the URLs and web site content stored in the cache to identify at least one second word or URL based on the received one or more characters and based on the received one or more additional characters; and providing the identified at least one second word or URL via a display of the communication device.

2. The method of claim 1, where the providing the identified at least one second word or URL comprises:

providing a plurality of words or a plurality of URLs that potentially correspond to information that the user is attempting to enter via the keypad, and providing the plurality of words or plurality of URLs prior to completion of entry of the information by the user.

3. The method of claim 1, where the searching URLs and the web site content stored in the cache comprises:

searching the URLs and web site content stored in the cache based on at least two prior words of a message input by the user.

4. The method of claim 1, further comprising:

storing URLs and web site content in the cache for a predetermined period of time.

5. The method of claim 1, further comprising:

storing at least portions of web pages in the cache for a predetermined period of time.

6. The method of claim 1, where the providing the identified at least one second word or URL comprises providing at least one of a plurality of words or a plurality of URLs, the method further comprising:

receiving a selection by the user corresponding to a first one of the plurality of words or a first one of the plurality of URLs;

storing the selected first one of the plurality of words or first one of the plurality of URLs in the updated database in response to the selection, the updated database being a more permanent storage location than the cache; and performing word recognition based on input from the user via the keypad based on information stored in the updated database.

7. The method of claim 1, further comprising:

viewing a picture or image;

identifying a name or word associated with the picture or image; and storing the identified name or word in the cache.

8. A communication device, comprising:

an input device configured to receive input from a user;

a memory that stores words and phrases based on text included in messages sent or received via the communication device;

a cache that stores web site identifiers and web site content from web sites accessed by the user;

a display; and a processor to:

search the memory to identify at least one first word or web site identifier based on the received input, provide the identified at least one first word or web site identifier via a display of the communication device, receive an indication that the user did not select the provided at least one first word or web site identifier;

search web site identifiers and web site content stored in the cache to identify at least one second word or web site identifier based on the received input, receive a selection corresponding to the at least one second word or web site identifier that was identified from the cache, and store the selected at least one second word or web site identifier in the memory.

9. The communication device of claim 8, where the processor is further to:

perform word recognition using information stored in the memory and the cache.

10. The communication device of claim 8, where when providing the at least one second word or web site identifier, the processor is to provide at least one uniform resource locator (URL).

11. The communication device of claim 10, where the URL is associated with a web site accessed by the communication device.

12. The communication device of claim 8, where when storing web site content, the processor is to store particular web site content in the cache for a predetermined period of time.

13. The communication device of claim 12, where the processor is further to delete the particular web site content stored in the cache based on at least one of a duration of time that the particular web site content has been stored in the cache or lack of selection by a user via the input device of words or web site identifiers selected from the particular web site content.

14. The communication device of claim 8, where the cache is further to store images or pictures and the processor is further to:

identify a name or word associated with the picture, and store the identified name or word in the cache.

15. The communication device of claim 8, where the cache comprises an index of words associated with information stored in the communication device.

16. The communication device of claim 8, where the input from the user comprises at least a portion of a message and when searching the cache, the processor is to:

search the cache to identify the at least one second word or web site identifier based on at least two previous words of the portion of the message.

17. The communication device of claim 8, where the input from the user comprises at least a portion of a message and when searching the cache, the processor is to:

search the cache to identify the at least one second word or web site identifier based on a previous word of the portion of the message, the previous word being located at least two words prior to the portion of the message.

18. The communication device of claim 8, where the communication device comprises a mobile terminal.

19. A memory device having stored thereon sequences of instructions executable by at least one processor, the memory device comprising:

one or more instructions to access web sites based on input from a user;

one or more instructions to store, in a cache, web site identifiers and web site content associated with accessed web sites;

one or more instructions to receive one or more characters from the user via an alpha-numeric keypad;

one or more instructions to search a database to identify at least one first potential word or identifier based on receiving a first input from the user, where the database is different from the cache and stores words and phrases based on text included in messages sent or received by the user;

one or more instructions to receive an indication that the user did not select the identified at least one first potential word or identifier, based on receiving additional input from the user;

one or more instructions to search the web site identifiers and web site content stored in the cache to identify at least one second potential word or identifier which the user intends to input, based on the received first input and based on the received additional input; and one or more instructions to provide the identified at least one second potential word or identifier to the user via a display.

20. The memory device of claim 19, further comprising instructions for causing the at least one processor to:

receive selections from the user corresponding to words or identifiers provided via the display and that were identified from the cache; and store the selected words or identifiers in the database, the database corresponding to a more permanent database than the cache.

* * * * *